H. B. PETERS.
TOOL DRIVING ATTACHMENT FOR AUTOMOBILES.
APPLICATION FILED NOV. 3, 1909.
964,311.
Patented July 12, 1910.
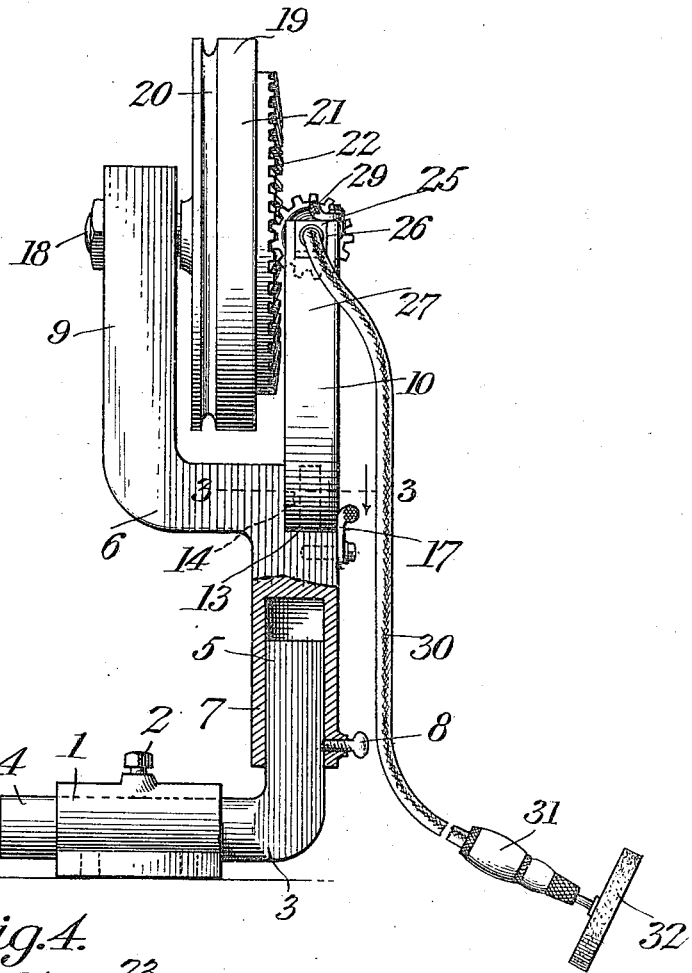
Fig. 1.
Fig. 4.
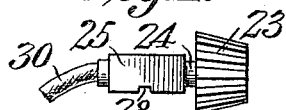
Fig. 2.
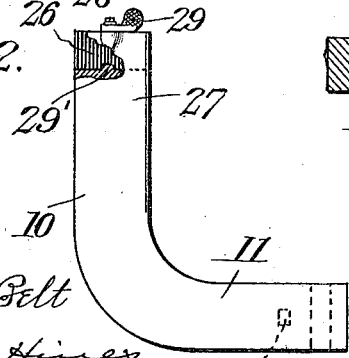
Fig. 3.
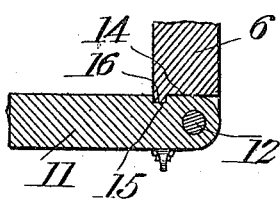
Witnesses
Fenton S. Belt
C. C. Hines.
Inventor
Harry B. Peters
By Victor J. Evans
Attorney

UNITED STATES PATENT OFFICE.

HARRY B. PETERS, OF SAUGERTIES, NEW YORK.

TOOL-DRIVING ATTACHMENT FOR AUTOMOBILES.

964,311.  Specification of Letters Patent.  Patented July 12, 1910.

Application filed November 3, 1909. Serial No. 526,122.

*To all whom it may concern:*

Be it known that I, HARRY B. PETERS, a citizen of the United States, residing at Saugerties, in the county of Ulster and State of New York, have invented new and useful Improvements in Tool-Driving Attachments for Automobiles, of which the following is a specification.

This invention relates to a tool driving attachment for automobiles, the object of the invention being to provide a simple, efficient and convenient device which may be attached to the frame of an automobile and operated by the power of the motor thereof for driving various kinds of tools used in making repairs, etc.

The invention consists of the features of construction, combination and arrangement of parts hereinafter fully described and claimed, reference being had to the accompanying drawing, in which:—

Figure 1 is a front elevation of the device, partially in section. Fig. 2 is a side elevation of the swinging bracket arm. Fig. 3 is a section on line 3—3 of Fig. 1. Fig. 4 is a detail view of the flexible shaft.

Referring to the drawing, 1 designates a socketed clamp adapted to be suitably secured to the frame of an automobile and provided with a set screw 2. Supported by the clamp is an L-shaped post 3, the horizontal arm 4 of which is fitted in the socket of the clamp and fixed against displacement by the set screw 2. The vertical arm 5 of the post supports a forked bracket 6 having a depending hollow stem 7 receiving said arm 5 and provided with a set screw 8 to fix it in position thereon. The arm 5 and socket of the stem are preferably angular in form to prevent rotation of the bracket, but they may be cylindrical to permit the bracket to be adjusted in a rotary path at any desired angle to the post.

The bracket 6 is provided with a fixed vertical arm 9 and an outwardly or laterally swinging vertical arm 10. The arm 10 is of elbow form, its horizontal portion 11 being mounted at its free end on a pivot pin 12 in a recess 13 at the upper end of the stem 5 and adapted to bear against a shoulder 14 at the inner end of said recess. Said portion 11 has a dowel seat 15 to receive a dowel pin 16 in the bracket so that the arm 10 when swung inward to operative position will be held firmly against vertical movement. A pivoted fastener 17 is provided on the post to engage and hold the arm 10 from outward pivotal movement.

The arm 9 is formed at its upper end with a bearing for a shaft 18 on which is mounted a wheel or pulley 19, which is shown as provided with a groove 20 and a friction surface 21, whereby it may be driven by a belt from the fly wheel of the engine or by direct frictional contact therewith. The outer or front face of this wheel is formed with bevel gear teeth 22 to mesh with a bevel pinion 23 on a stub shaft 24 journaled in a bearing block 25 fitted in a slot or open bearing 26 in the upper end of the vertical portion 27 of the arm 10, which block is formed in its underside with a groove or recess 28 to receive a rib or projection 29' on the bottom wall of the slot. On the arm 10 is a pivoted turn button or fastening 29 to hold the block from upward movement and displacement. Connected with shaft 24 is a flexible shaft 30 carrying a handle 31 forming a chuck to receive the stem or shank of a buffing wheel 32 or any other kind of desired tool.

From the foregoing description, it will be understood that the device may be fastened to the frame of an automobile and the flexible shaft driven from the motor thereof to drive a buffing wheel or other tool for polishing or otherwise working upon parts of the vehicle or in doing general machine work. By means of the adjustable connection between the bracket and post the bracket may be adjusted vertically and laterally to suit different conditions. Upon turning down the button 17 the arm 10 may be swung outward to disengage the pinion 23 from the gear teeth 22, and then by swinging the button 29 outward the bearing block 25 may be removed to enable the flexible shaft and parts to be detached for convenience in packing and storing the implement or in substituting different sizes of pinions as the occasion may require. The advantages of the device will accordingly be obvious without further description.

Having thus described the invention what is claimed as new, is:—

1. A device of the character described comprising a forked bracket having relatively fixed and movable arms, a drive wheel journaled on the fixed arm and provided with gear teeth, means for holding the movable arm from movement, a bearing block removably mounted on the movable arm, a pinion journaled in said bearing block and meshing with the teeth of the wheel, and a flexible shaft driven by said pinion.

2. A device of the character described comprising a forked bracket having relatively fixed and movable arms, the movable arm having a slot therein, a drive wheel journaled on the fixed arm and provided with gear teeth, means for holding the movable arm from movement, a bearing block removably mounted in said slot, means for holding the same in position, a pinion journaled in said bearing block and meshing with the teeth of the wheel, and a flexible shaft driven by said pinion.

3. A device of the character described comprising an attaching member, a post carried thereby, a forked bracket adjustably mounted on the post and having relatively fixed and movable arms, a drive wheel journaled on the fixed arm and provided with gear teeth, means for holding the movable arm from movement, a bearing block removably mounted on the movable arm, a pinion journaled in said bearing block and meshing with the teeth of the wheel, and a flexible shaft driven by said pinion.

In testimony whereof I affix my signature in presence of two witnesses.

HARRY B. PETERS.

Witnesses:
 BYRON L. DAVIS,
 MARIE C. JOHNSON.